D. M. BOONE.
TIRE TOOL.
APPLICATION FILED JAN. 6, 1920.
1,376,070.
Patented Apr. 26, 1921.
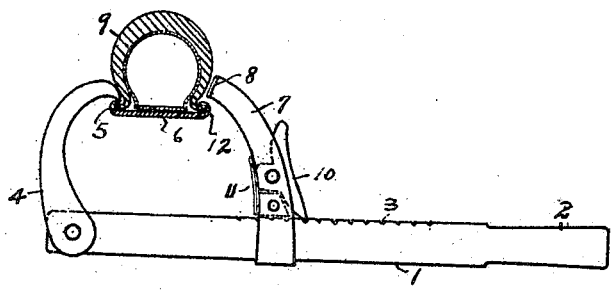
Fig. 1.
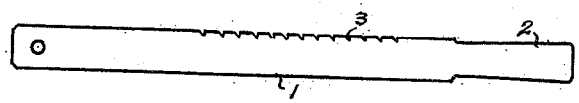
Fig. 2.
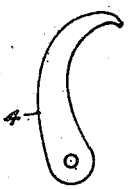 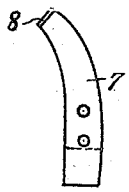   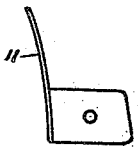
Fig. 3.  Fig. 4.  Fig. 5.  Fig. 6.  Fig. 7.
INVENTOR
Daniel M. Boone
BY
ATTORNEYS

UNITED STATES PATENT OFFICE.

DANIEL M. BOONE, OF HARRISBURG, TEXAS.

TIRE-TOOL.

1,376,070.   Specification of Letters Patent.   Patented Apr. 26, 1921.

Application filed January 6, 1920. Serial No. 349,748.

*To all whom it may concern:*

Be it known that I, DANIEL M. BOONE, citizen of the United States, residing at Harrisburg, in the county of Harris and State of Texas, have invented certain new and useful Improvements in Tire-Tools, of which the following is a specification.

This invention relates to new and useful improvements in a tire tool.

One object of the invention is to provide a tool of the character described which has been specially designed for use in mounting pneumatic tires on wheel rims.

Another object of the invention is to provide a device of the character described which is of simple construction, which may be easily operated and which is effective in accomplishing the purpose intended.

With the above and other objects in view the invention has particular relation to certain novel features of construction, arrangement of parts and use, an example of which is given in this specification and illustrated in the accompanying drawings, wherein;—

Figure 1, is a side elevation of the tool in use.

Fig. 2, is a side view of the manual lever employed.

Fig. 3, shows a side view of the hook employed.

Fig. 4, shows a side view of the push bar.

Fig. 5, shows an edge view thereof.

Fig. 6, shows a side view of the dog employed and

Fig. 7, shows a side view of the dog actuating spring employed.

Referring now more particularly to the drawings, the numeral 1 designates the manual lever one end of which is formed into a handle 2 and one edge of which has the notches 3. Pivoted to the other end of said lever is a hook 4 designed to be engaged over one of the flanges 5 of the wheel rim 6. Slidably mounted on the lever 1 is the arcuate push bar 7, whose free end is formed into a flat push plate 8, adapted to rest against the side of the tire 9, opposite the hook 4. A dog 10 is pivoted to the push bar and one end thereof is formed to engage in one of the notches 3, while the pressure spring 11 presses against the inner side of said dog to hold it in said engagement. This spring is attached to the push bar 7 as shown. In use the tire is first placed on the rim at one side and the hook 4 engaged over the flange 5 as shown in Fig. 1. The push bar 7 is then moved on the lever 1 until the plate 8 rests against the adjacent side of the tire and the dog then engaged in one of the notches 3. The handle 2 is then grasped on an upward pull exerted until the push bar forces the side of the tire over the flange 12. The wheel is gradually turned on its spindle and the tool moved around the rim and pressure thus applied to the tire until it is forced on to the rim all of the way around.

What I claim is:—

A tool of the character described, including a manual lever, one end of which is formed into a handle and one edge of which is provided with spaced notches, a hook pivoted to the other end of said lever and adapted to be engaged over one of the flanges of an automobile wheel rim, an arcuate push bar slidably mounted on the lever, a push plate formed integrally with the free end of said bar and adapted to rest against one side of the tire to be mounted, a dog pivoted to the push bar and one end of which is formed to engage in one of said notches, a spring attached to the push bar and pressing against the inner side of said dog to hold it in said engagement.

In testimony whereof I have signed my name to this specification in the presence of two subscribing witnesses.

DANIEL M. BOONE.

Witnesses:
ALBERTA ALLEN,
A. CATHEY.